United States Patent
Morris et al.

(10) Patent No.: US 9,199,803 B1
(45) Date of Patent: Dec. 1, 2015

(54) PARTS SUPPLY SYSTEM FOR ROBOT MANUFACTURING SYSTEM

(71) Applicants: James R Morris, Pine Valley, NY (US); Michael L Lucey, Corning, NY (US)

(72) Inventors: James R Morris, Pine Valley, NY (US); Michael L Lucey, Corning, NY (US)

(73) Assignee: Automated Cells and Equipment, Inc., Painted Post, NY (US)

( * ) Notice: Subject to any disclaimer, the term of this patent is extended or adjusted under 35 U.S.C. 154(b) by 147 days.

(21) Appl. No.: 14/176,325

(22) Filed: Feb. 10, 2014

Related U.S. Application Data

(60) Provisional application No. 61/763,004, filed on Feb. 11, 2013.

(51) Int. Cl.
| | | |
|---|---|---|
| *B65G 1/07* | (2006.01) |
| *B65G 1/14* | (2006.01) |
| *B65G 59/02* | (2006.01) |
| *B65G 65/02* | (2006.01) |
| *B65G 47/74* | (2006.01) |
| *B65G 37/00* | (2006.01) |
| *B65G 1/04* | (2006.01) |

(52) U.S. Cl.
CPC .............. *B65G 47/74* (2013.01); *B65G 1/045* (2013.01); *B65G 1/07* (2013.01); *B65G 1/14* (2013.01); *B65G 37/00* (2013.01); *B65G 59/026* (2013.01); *B65G 65/02* (2013.01)

(58) Field of Classification Search
CPC ........ B65G 1/045; B65G 1/0464; B65G 1/06; B65G 1/07; B65G 1/133; B65G 1/14; B65G 29/00; B65G 65/02; B65G 59/02; B65G 59/026; B65G 47/74; B65G 37/00

USPC .......... 198/345.1, 346.1, 347.1, 473.1, 478.1, 198/481.1, 612

See application file for complete search history.

(56) References Cited

U.S. PATENT DOCUMENTS

| | | | | |
|---|---|---|---|---|
| 3,621,828 | A | * | 11/1971 | Hansen ...................... F41J 9/30 124/47 |
| 4,558,802 | A | * | 12/1985 | Molison ............... B65G 47/514 221/104 |
| 5,395,208 | A | * | 3/1995 | Mojden ................. B65B 43/145 221/11 |
| 5,473,810 | A | | 12/1995 | Demarest et al. |
| 5,509,191 | A | | 4/1996 | Best |
| 5,664,322 | A | | 9/1997 | Best |
| 5,680,694 | A | | 10/1997 | Best |
| 5,709,303 | A | | 1/1998 | Best |
| 6,112,405 | A | | 9/2000 | Inkster |
| 6,435,582 | B1 | | 8/2002 | DaSilva et al. |
| 6,655,015 | B2 | | 12/2003 | Kraenzle |
| 7,047,706 | B2 | | 5/2006 | Kraenzle |
| 7,950,131 | B2 | | 5/2011 | Hilliard |
| 7,984,602 | B2 | | 7/2011 | Kraenzle |
| 2012/0251275 | A1 | * | 10/2012 | Malin .................... C12M 23/10 414/225.01 |
| 2014/0238613 | A1 | * | 8/2014 | Humele .................... B65C 9/00 156/538 |

\* cited by examiner

*Primary Examiner* — Mark A Deuble
(74) *Attorney, Agent, or Firm* — Randall L. Reed; Miller Mayer LLP

(57) ABSTRACT

An apparatus that provides a continuous flow of parts to a manufacturing robot during a manufacturing process has a plurality of adjustable parts caddies on rotating carousel where the parts used in manufacturing process are placed in each adjustable caddy on an operator side of the apparatus and then taken out of the caddy on a production side as the carousel turns. A lift mechanism on the production side works in conjunction with the adjustable caddies and a manufacturing robot to position parts in each caddy in a predefined position for pick up by the manufacturing robot.

12 Claims, 9 Drawing Sheets

PARTS SUPPLY SYSTEM FOR ROBOT MANUFACTURING SYSTEM

CROSS-REFERENCE TO RELATED APPLICATIONS

This application claims the benefit of priority under 35 U.S.C. §119 of U.S. Provisional Application Ser. No. 61/763,004 filed on Feb. 11, 2013 the content of which is relied upon and incorporated herein by reference in its entirety.

TECHNICAL FIELD

The disclosure relates generally to a system and apparatus for facilitating an automated manufacturing process, more particularly it relates to a system and apparatus for providing a steady and uninterrupted stream of prepositioned articles in a manufacture process for robot pickup.

BACKGROUND

Human operators have been tending, loading and unloading manufacturing machines for many years. While human operators allow for flexibility in the manufacturing process, they also introduce errors due to the repetitive nature of automated mass assembly lines, they add to cost, and require frequent downtime. Modern day manufacturing practices dictate continual process improvement including: increased part quality, increased throughput, increased reliability, decreased part cost, reduced scrap, and continuous operation sometimes 24/7. One method for meeting these goals is the use robotics. Industrial robots are good at repetitive motions and are very good at material handling such as pick and place applications. Robots minimize the variables an operator introduces when handling parts such as, improper part placement into the manufacturing machine, dropped or damaged parts or even the inconsistency in loading or unloading a waiting manufacturing machine in a timely manner. Many times the use of robotics enables a human operator to control operation of multiple manufacturing machines as opposed to being tied to tending just one machine.

One critical aspect for the successful implementation of robotic manufacturing and material handling applications is that parts must be presented to the manufacturing robot in a consistent, reliable and repeatable method. The second aspect is that the human operator understands supports and is able to provide a continuous uninterrupted supply of parts to the manufacturing robot during the production process. Accordingly, there is a need in the industry for a method and apparatus for providing an intuitive consistent parts supply for robot assisted manufacturing.

SUMMARY

Thus, robotic tending machines that provide an uninterrupted flow of parts to a robotic manufacturing machine during the manufacturing process are important parts of the robotic manufacturing process. By providing a steady flow of parts to the robotic manufacturing system they ensure an uninterrupted operation of the system that maximizes its value.

In one variation the present invention provides a system that can provide an uninterrupted flow of parts to a robotic manufacturing machine. It includes a carousel with eight adjustable part caddies placed on arms on the periphery of the carousel. Each parts caddie holds a stack of pans needed in a robotic manufacturing process, such as gears or similar parts. The carousel rotates successively into a dispensing position each caddy full of parts needed in the specific manufacturing process. At the parts dispensing position, a mechanical lift arm raises the stack of parts which sit on a movable lift plate to a position where a robotic manufacturing arm takes each part in the raised stack and uses it in the manufacturing process that the robotic manufacturing system has been programmed to do. As the robotic arm takes a part from the stack the mechanical lift arm in response to a signal sent to the systems control computer by an appropriately placed sensor then incrementally moves the stack of parts up so that the next part in the stack is in the predetermined position to be grasped by the robotic arm. When the caddy is emptied of all parts, the system lowers the empty lift plate and then positions itself below the carousel. The carousel then rotates the next full parts caddy into the dispensing position and the process starts over. On the side of the carousel opposite the dispensing position, clam shell type doors can be rotated open and shut by operator at the tending station who refills the empty caddies with parts to assure the uninterrupted flow of manufacturing process. The rotating doors are designed to limit the amount of space needed for the system.

In another variation of the invention the parts supply caddy includes: a) a base plate with at least three posts movably mounted at a first end of the posts to a top surface of the base plate; b) a lever plate with at least three slot shaped apertures which allow the lever plate to be placed over the movably mounted posts and allow the posts to protrude up through the lever plate which lever plate rests on top of the base plate and wherein when the lever plate is moved with respect to the base plate it changes the position of the movably mounted posts to thereby provide a variable holding space between the posts to hold a stack of items of varying size depending on the space between the posts as determined by movement of the lever plate; c) the at least three movably mounted posts are movably mounted by offset extended base portions from a pivot point such that they are movable in an arch about the pivot point, which pivot points are located on a circumference of a circle about a center of the base plate; d) the lever plate is detachably and rotatably attached at the center of the base plate and the slot shaped apertures in the lever plate through which the posts project are formed in the shape of an arch such that when the lever plate is rotated about its center on the base plates the posts move in unison either in towards or out away from the center of the lever plate to thereby describe a variable space that can hold a stack of items of varying size depending the extent the lever plate is rotated; e) a lift plate with three slotted apertures through which the three pivotally mounted posts can project, the lift plate being position able over the lever plate and the slots of the lift plate configured to accommodate movement of the posts by the lever plate such that a stack of items can be placed on the lift plate within the space between the posts and wherein the lift plate extends beyond an edge of the base plate and the lever plate to thereby allow an elevating mechanism to lift the lift plate off of the lever plate and thereby lift a stack of items on the lift plate for prepositioning items at the top of the stack of items for access by a manufacturing robot; and f) a scale positioned at a periphery of the lift plate such that a flange projecting from the lever plate, when the lift plate is positioned on the lever plate aligns with the scale and when calibrated can accurately define the space provided between the posts when the lever plate is moved to adjust a position of the posts.

In another aspect of the invention it provides a parts supply apparatus for providing a continuous supply of parts for a manufacturing process that includes: a) a carousel rotatable about a center; b) a plurality of adjustable parts caddies positioned on the carousel, the parts caddies being adjustable to hold stacks of parts of varying size and each caddy having a lift plate to allow the moving up of a stack of parts placed on the caddies; c) a power source to rotate the carousel about its center; d) a production side stop position wherein each parts caddy can be successively positioned by rotation of the carousel to position each of the parts caddies with parts for access by a manufacturing robot; e) an operator side stop position wherein each of the parts caddies can be successively positioned by rotation of the carousel to position each of the parts caddies for placing a stack of parts in the caddy; and f) a lift arm at the production side stop position for engaging the lift plate of each of the parts caddies as they are successively positioned at the production side stop position for lifting the lift plate with a stack of items to a predetermined placement position at which a manufacturing robot can grasp an item at the top of a stack of items on the lift plate.

In yet another variation of the invention it provides a method for providing a continuous flow of work pieces for a manufacturing robot during a manufacturing operation which method includes the steps of: a) providing a carousel rotatable about a center, b) providing a plurality of adjustable parts caddies; c) positioning said plurality of adjustable parts caddies on said carousel, said plurality of parts caddies being adjustable to hold stacks of work pieces of varying size and each caddy having a lift plate to allow the lifting up of a stack of work pieces placed on said plurality of caddies; d) providing a power source to rotate said carousel about its center; e) rotating in incremental steps said carousel so that each of said plurality of caddies can be successively positioned at a production side stop position where worked pieces positioned in each said caddies can be accessed by a manufacturing robot; f) successively positioning each of said caddies after it has been emptied of work pieces at an operations position wherein each of said caddies can be successively filled with a new set of work pieces; and g) providing a lift arm at said production side stop position for engaging said lift plate on each of said plurality of parts caddies positioned at said production side stop position for progressively lifting said lilt plate with a stack of work pieces to a predetermined placement position at which a manufacturing robot can grasp a work piece at the top of a stack of work pieces on said lilt plate.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
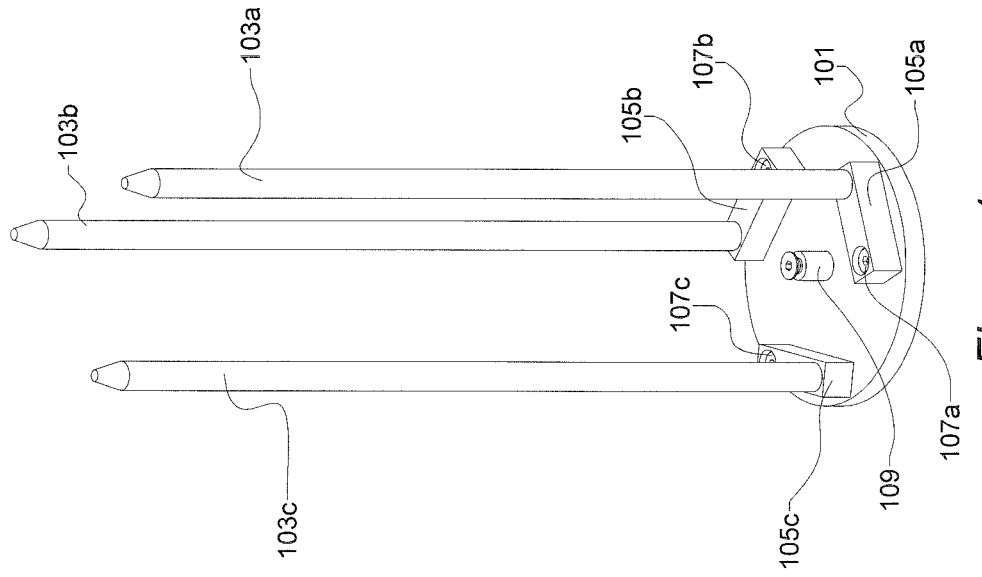
FIG. 1 is a perspective view of the base plate with moveable posts.

FIG. 1 provides a perspective view of the primary structure of the caddy. Base plate 101 has three adjustable posts 103a, 103b and 103c. Each post at its base is attached to one end of a moveable arm 105a, 105b and 105c. The opposite end of each movable arm 105a, 105b and 105c are rotate-ably attached to base plate 101 at pivot points 107a, 107b and 107c respectively. The base plate 101 also has at its center retention post 109.

Figure 2:
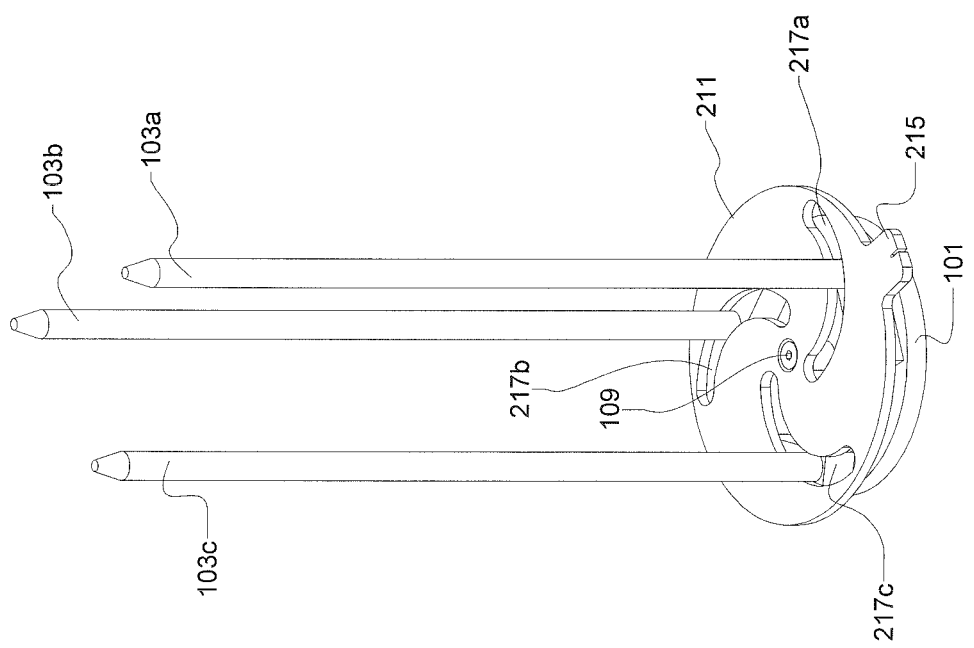
FIG. 2 is a perspective view of lever plate placed over the base plate with the post projecting through the lever plates.

Referring to FIG. 2, placed over posts 103a, 103b and 103c is an adjustable lever plate 211 above base plate 101. Adjusting lever plate 211 has adjusting knob 215 which allows for the rotational motion of the plate around a center retention post 109 to which the center of adjusting lever plate is rotate-ably attached. Each of the posts 103a, 103b and 103c project up through curved adjusting slots 217a, 217b and 217c on adjusting lever plate 211. Adjusting slots 217a, 217b and 217c have a curvature so that when knob 215 is either moved clockwise or counterclockwise around center retention post 109, the three posts 103a, 103b and 103c move in unison either inward or outward. This movement allows for precisely positioning each one of the posts at the same distance from the center point, namely center retention post 109.

Figure 3:
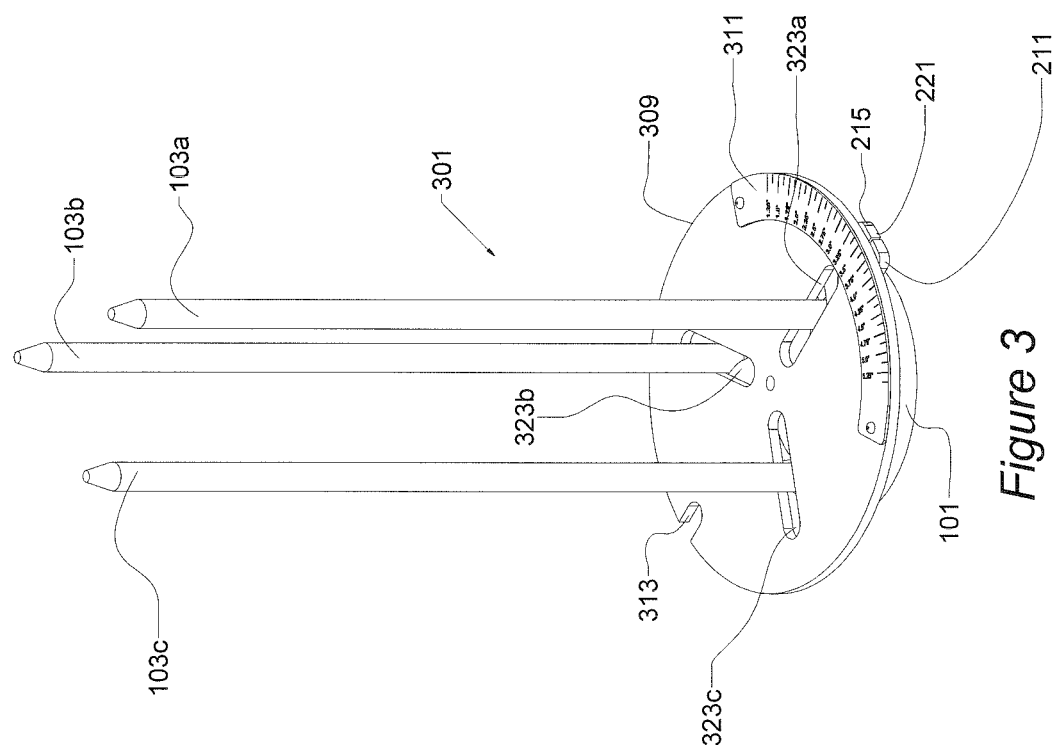
FIG. 3 is a perspective view of the base plate and lever plate with the lift plate sitting on top of the lever plate.

FIG. 3 provides a perspective view of a fully assembled adjustable parts caddy 301. Lift plate 309 is positioned over the three posts 103a, 103b and 103c of base plate 101 with adjusting lever plate 211 positioned between them. Each post 103a, 103b and 103c projects up through lift plate slide slots 323a, 323b and 323c respectively in lift plate 309. Lift plate 309 is not physically attached to the base plate 101. Lift plate 309 rests on and the adjusting lever plate 211 and is not attached to it. Additionally, lift plate 309 has post position or parts size measuring scale 311 along its outside periphery. When adjusting lever plate 211 is moved by moving adjusting knob in either clockwise or counterclockwise direction, posts 103a, 103b and 103c move back and forth in unison in slots 323a, 323b and 323c. This is caused by their moving along the curved slots of adjusting lever plate 211. An indexing slot 221 in knob 215 indicates on scale 311 the outside radius of parts that can be placed in the caddy. Lift plate 309 also has retention notch 313. Given the configuration of the slots 323a, b & c in plate 309 the orientation of scale 311 remains in the same and correct orientation even as adjustable lever plate 211 is rotated to change the position of posts 103a, b & c.

Figure 4:
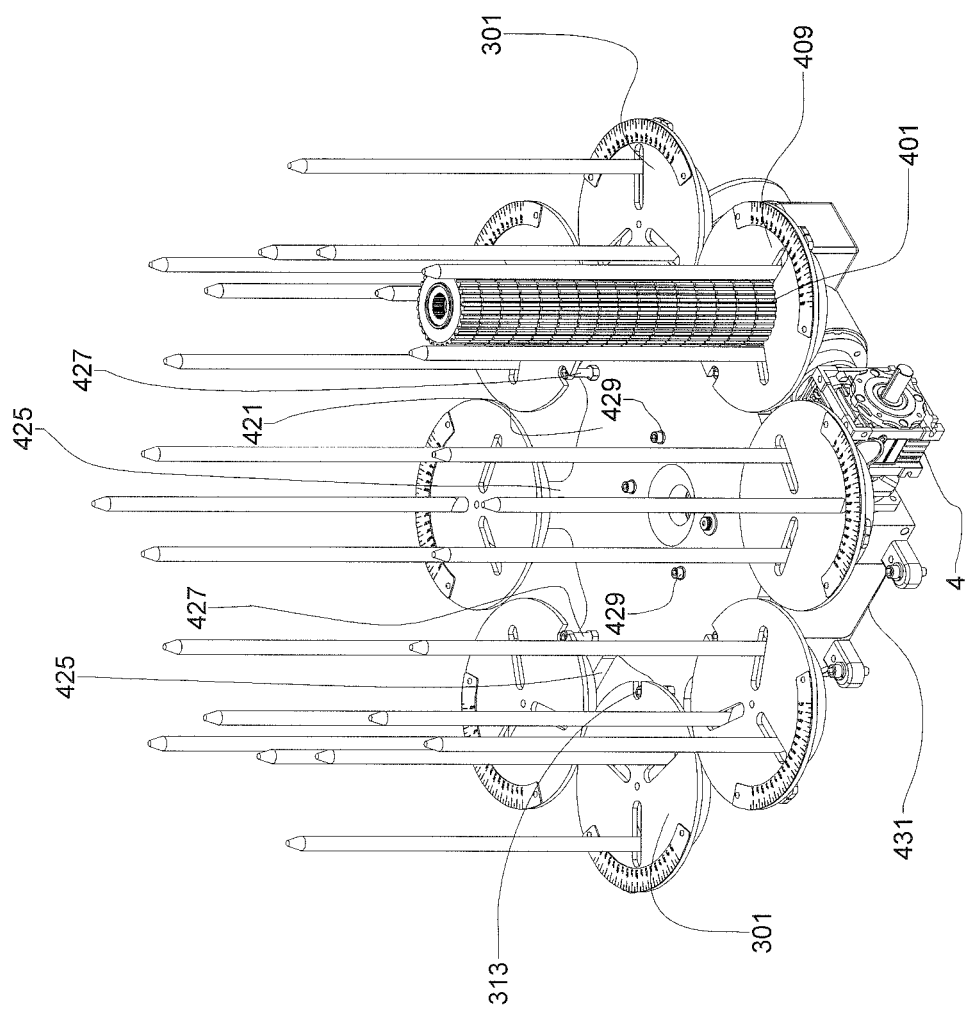
FIG. 4 is perspective view of a carousal with adjustable parts caddies around its periphery.

Referring to FIG. 4, in the embodiment of the invention shown therein adjustable parts caddy carousel 421 has eight adjustable caddies 301 located around its periphery on arms 425. Each arm has a notch holding pin 427 that holds the top plate of each adjustable caddy in place by fitting into retention notch 313 of each of the caddies. Carousel 421 is connected at its center by four bolts 429 to a motive and control apparatus 431 located thereunder. Naturally depending on the circumference of carousel 421 and the size of parts caddies 301 the number of parts caddies that can be positioned on a carousel made according to the present invention can vary. Thus, given these variables the carousel and parts caddies can vary in size and the number of parts caddies on the carousel can vary from less than eight to twelve or more. As can be seen in FIG. 4 parts caddy 409 is filled with a stack of gears.

Figure 5:
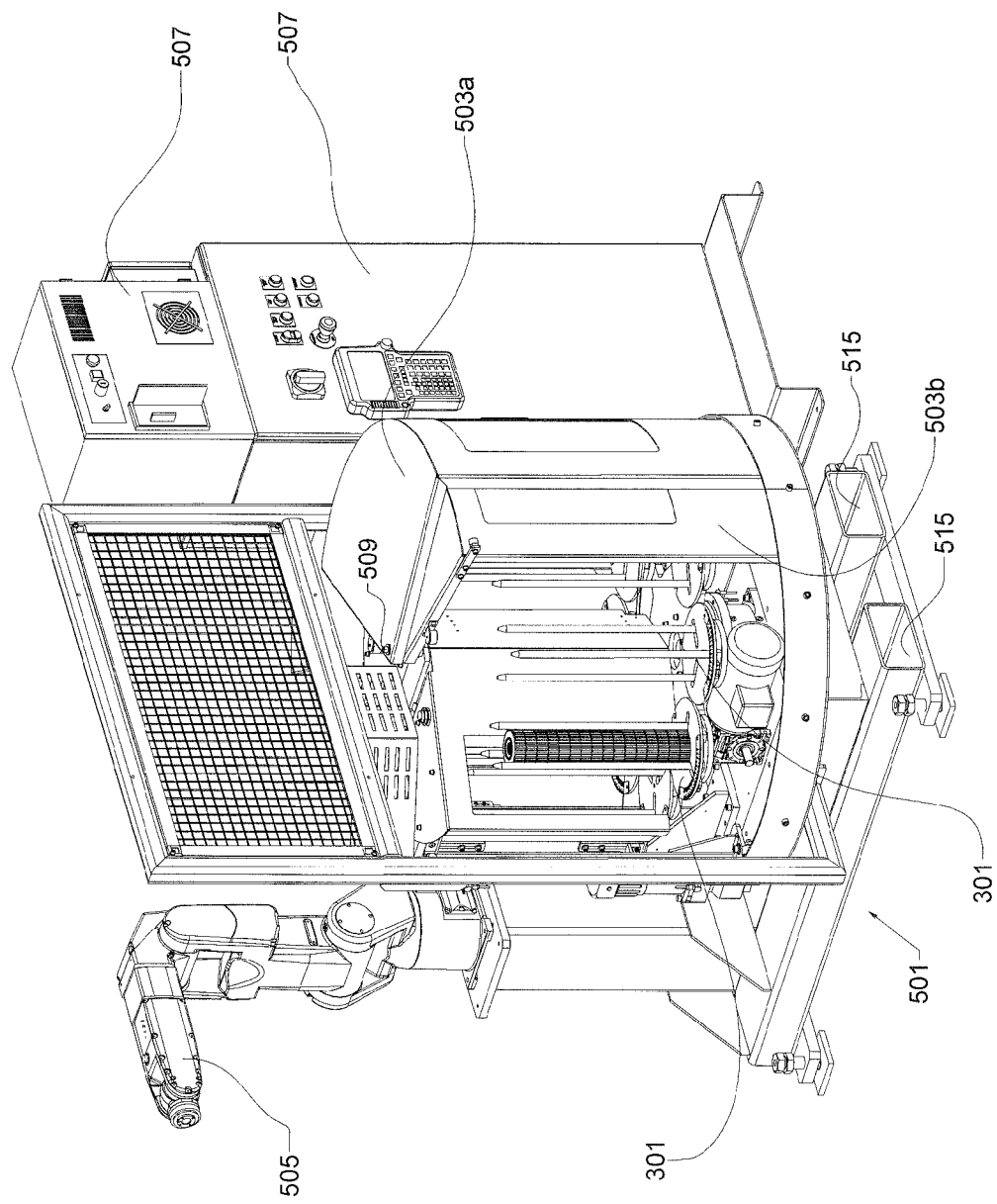
FIG. 5 is a perspective view of the system from the operator side.

FIG. 5 provides a perspective view of the overall parts supply system from the operator tending side 501. Outer rotary door 503a and inner rotary door 503b are in a partially open position. Both doors attach at pivot point 509 and have bearings or some other means at their base to allow them to freely slide in a clockwise or counter clockwise direction to provide access to the caddies or enclose the tending side as needed. Thus doors 503a and 503b can be opened or closed by simply sliding the interior door 503b under the outer door 503a or vice versa, sliding outer door 503a over interior door 503b. This provides ready access for an operator without the need for excessive floor space that would be necessitated by a standard hinged door. Thus, the operator can access and easily fill the cadies 301 on carousel 421 as each empty caddy rotates around to the operator side after robot arm 505 has emptied each full caddy at the dispensing or production stop position. Robotic arm 505 picks up each part from the pre-positioned caddies. Additionally, the system control station 507 is positioned adjacent to the system and provides computer and electronic control of the operation of the system. It contains a standard programmable computer which can be programmed to operate the system in the desired manner. Fork lift fork sheaths 515 allow for the insertion of the forks of a fork lift into the base of the system so the system can be easily moved around and positioned in the manufacturing facility.

Figure 6:
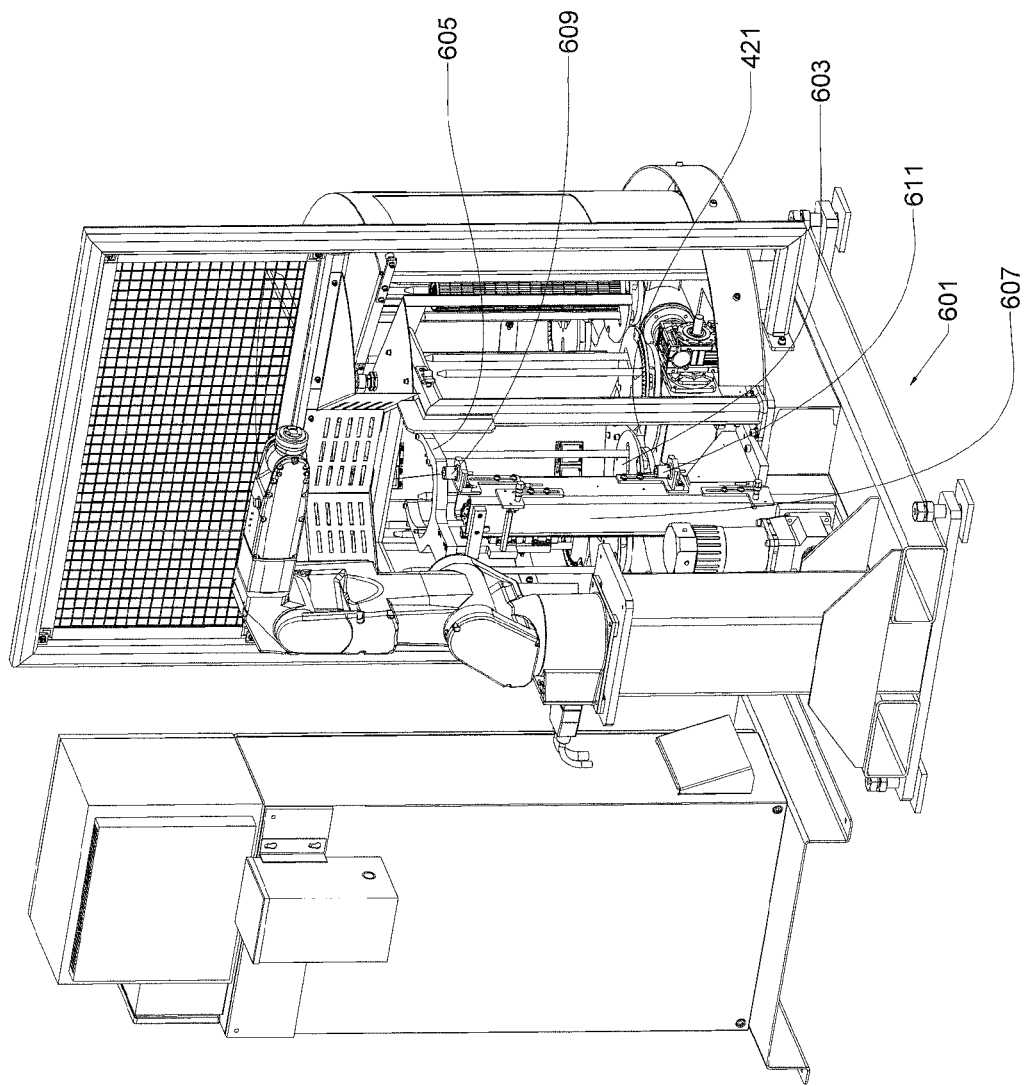
FIG. 6 is a perspective view of the system from the production side.

FIG. 6 is a perspective view of the manufacturing production side 601 of the current system. Dispensing position 603 is visible adjacent to lift arm 607. Additionally, lift fork 605 which curves around the posts of the caddy located at the dispensing position is at its fully top extended position without a lift plate on it for illustrative purposes. Laser sensor 609 is positioned to determine if a part is located at the appropriate position for robotic arm 505 to take the next part. The information provided by laser sensor 609 tells the control system 507 to advance lift fork 605 by means of lift arm 607 up to the next position to properly position parts that would be on a lift plate. Once the last part in the stack of parts placed on the caddy has been removed lift fork 605 will have reached its highest position and the sensor signals that there are no longer any parts left with this caddy. Accordingly, it signals lift arm 607 to drop lift fork 605 down to a position below carousel 421 to thereby allow carousel 421 to advance the next full caddy to dispensing or production stop position 603. The process is then repeated where the lift plate 309 of the caddy 301 full of parts that is now positioned at dispensing position 603 is emptied of pans in the same fashion. As can be seen in FIG. 6 lift fork 605 is in the shape of fork or horseshoe in the embodiment depicted.

Figure 7:
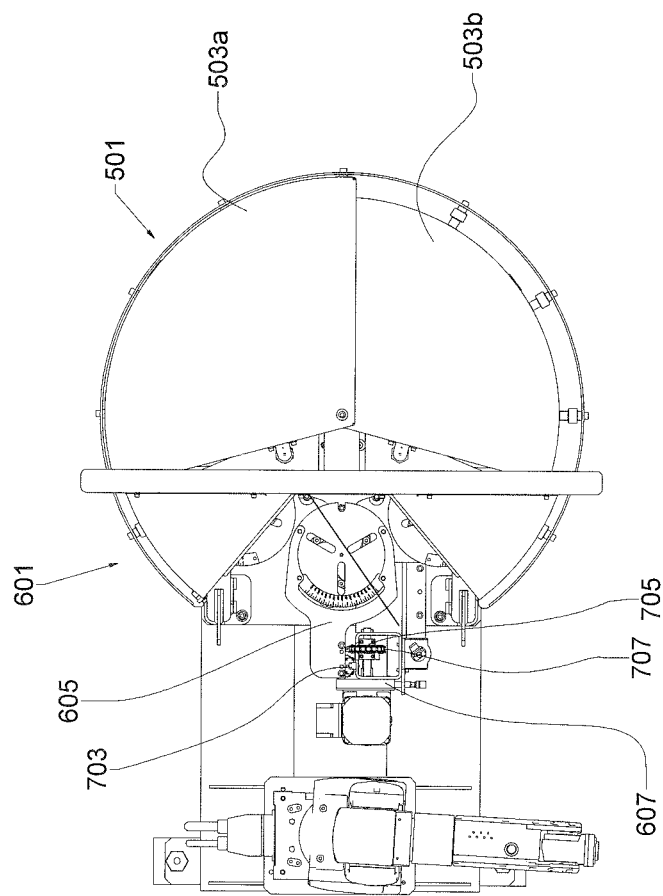
FIG. 7 is a top plane view of the system including the elevation mechanism for lifting the lift plate on each caddy.

FIG. 7 provides a top view of the system where the tender/operator side 501 appears and the production/manufacturing side 601 is positioned opposite it. Doors 503a and 503b are in the closed position. Lift fork 605, which attaches by connector 703 to lift arm 607 can be seen. Additionally, sprocket 707 and drive chain 705 of lift arm 607 can be seen.

Figure 8:
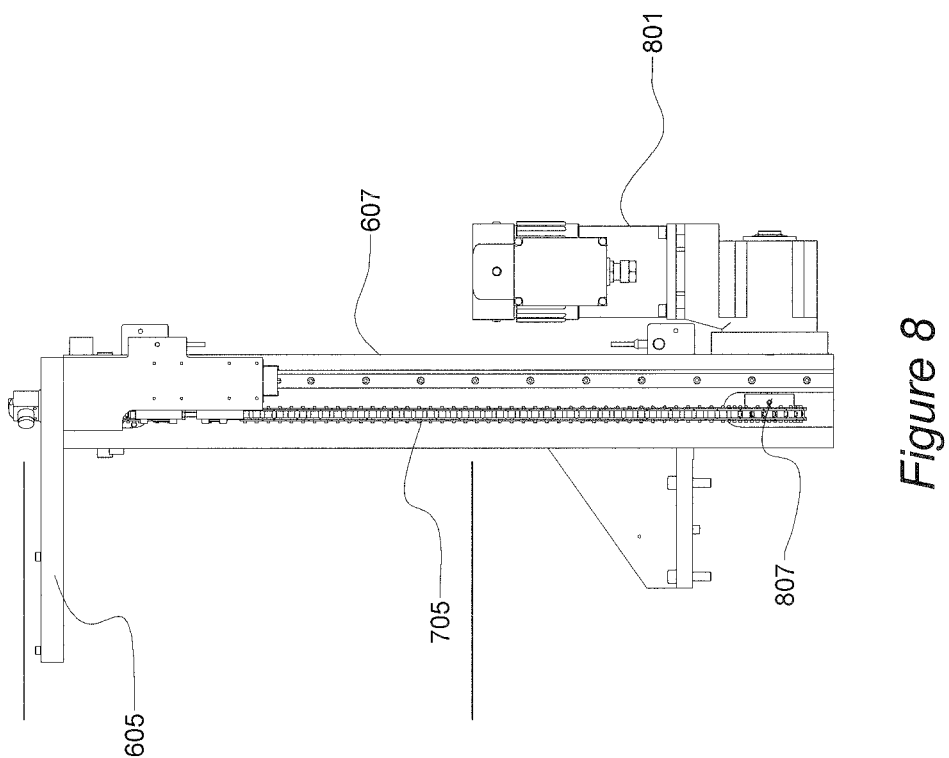
FIG. 8 is a side view of the lift arm and lift fork.

Referring to FIG. 8, a side view of lift arm 607 is presented with lift fork 605, chain 705 and the lower sprocket 807 of the lift arm. Lift arm drive motor 801 is operatively connected to sprocket 807 which in turn drives chain 705 to control movement of lift fork 605. Motor 801 is controlled by computerized control system 507.

Figure 9:
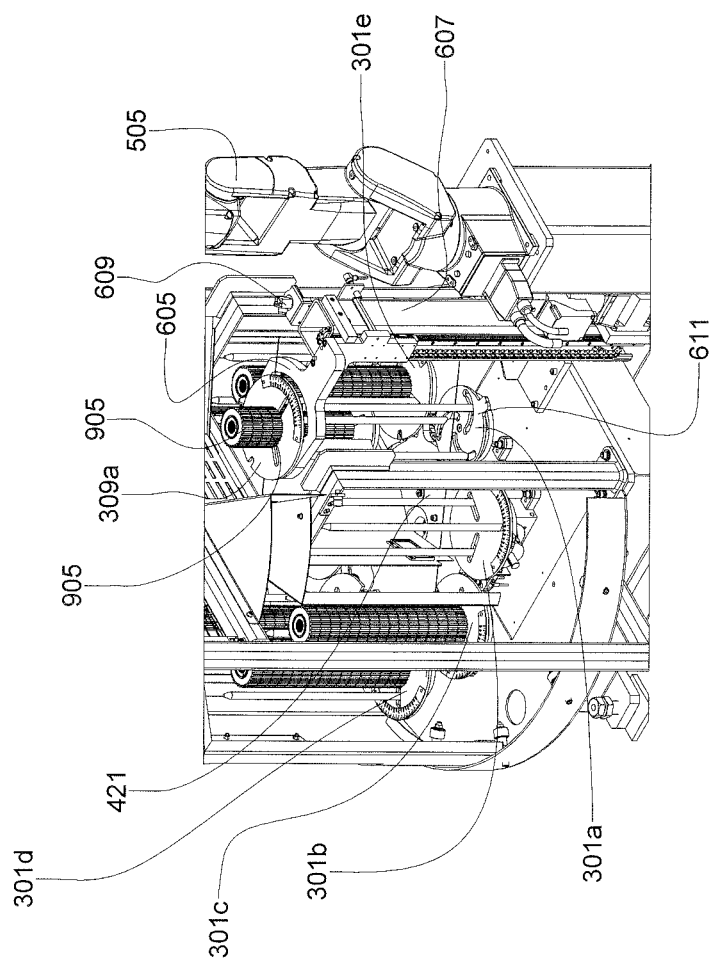
FIG. 9 is a perspective view of the system from the production side adjacent to the robotic arm.

FIG. 9 is a perspective view of the system from the production side adjacent to robotic arm 505 and shows the system in operation. Lift fork 605 holds lift plate 309 of parts caddy 301a, which has four work pieces 905 left on it. After manufacturing robot arm 505 removes all of the work pieces 905 from lift plate 309a lift arm 607 will lower lift fork 605 to a point below parts caddy 301a and the bottom of carousel 421. Once lift fork 605 is at its fully retracted position 611 carousel 421 will then advanced in a clockwise direction to the left in FIG. 9 to bring the next full parts caddy 301e to the production stop position 603 where lift arm 607 will lift the lift plate 309 of caddy 301e with work pieces 905 on it in to the predetermined position where robot arm 505 will pick each work piece in sequence and use the work piece in the particular manufacturing process it is engaged in. Empty parts caddy 301b is visible in FIG. 9 it having been emptied of work pieces. Also, parts caddies 301c and 301d are visible on the operator side of the system where they have been refilled with more work pieces. Laser sensor 609 positioned on top of lift arm 607 and as noted is operatively connected to the computer control system and is used to determine if the work pieces are in the predetermined position for pick up by robot arm 505 and when the caddy has been completely emptied so the next full caddy can be moved into the production stop position to continue the manufacturing process.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A parts supply caddy comprising:
    a. a base plate with at least three posts movably mounted at a first end of said posts to a top surface of said base plate; and
    b. a lever plate with at least three slot shaped apertures which allow said lever plate to be placed over said movably mounted posts and allow said posts to protrude up through said lever plate which lever plate rests on top of said base plate and wherein when said lever plate is moved with respect to said base plate it changes the position of said movably mounted posts to thereby provide a variable holding space between said posts to hold a stack of items of varying size depending on said space between said posts as determined by movement of said lever plate.

2. The parts supply caddy of claim 1 wherein
    a. said at least three movably mounted posts are movably mounted by offset extended base portions from a pivot point such that they are movable in an arch about said pivot point, which pivot points are located on a circumference of a circle about a center of said base plate; and b. said lever plate is detachably and rotateably attached at said center of said base plate and said slot shaped apertures in said lever plate through which said posts project are formed in the shape of an arch such that when said lever plate is rotated about its center on said base plates said posts move in unison either in towards or out away from said center of said lever plate to thereby describe a variable space that can hold a stack of items of varying size depending the extent said lever plate is rotated.

3. The parts supply caddy of claim 2 further comprising a lift plate with three slotted apertures through which said three pivotally mounted posts can project, said lift plate being position able over said lever plate and said slots of said lift plate configured to accommodate movement of said posts by said lever plate such that a stack of items can be placed on said lift plate within said space between said posts and wherein said lift plate extends beyond an edge of said base plate and said lever plate to thereby allow an elevating mechanism to lift said lift plate off of said lever plate and thereby lift a stack of items on said lift plate for prepositioning items at the top of the stack of items for access by a manufacturing robot.

4. The parts supply caddy of claim 1 further comprising a lift plate with at least three slotted apertures through which said three pivotally mounted posts can project, said lift plate being position able over said lever plate and said slots of said lift plate configured to accommodate movement of said posts by said lever plate such that when a stack of items is placed on said lift plate within said space between said posts and wherein said lift plate extends beyond an edge of said base plate and said lever plate to thereby allow an elevating mechanism to lift said lift plate off of said lever plate and thereby lift a stack of items on said lift plate for prepositioning an item at the top of the stack of items for access by a manufacturing robot.

5. The parts caddy of claim 4 further comprising a scale positioned at a periphery of said lift plate such that a flange projecting from said lever plate, when said lift plate is positioned on said lever plate aligns with said scale and when calibrated can accurately define the space provided between said posts when said lever plate is moved to adjust a position of said posts.

6. A parts supply apparatus for providing a continuous supply of parts for a manufacturing process comprising:
   a. a carousel rotatable about a center;
   b. a plurality of adjustable parts caddies positioned on said carousel, said parts caddies being adjustable to hold stacks of parts of varying size and each caddy having a lift plate to allow the moving up of a stack of parts placed on said caddies;
   c. a power source to rotate said carousel about its center;
   d. a production side stop position wherein each parts caddy can be successively positioned by rotation of said carousel to position each of said parts caddies with parts for access by a manufacturing robot;
   e. an operator side stop position wherein each of said parts caddies can be successively positioned by rotation of said carousel to position each of said parts caddies for placing a stack of parts in said caddy; and
   f. a lift arm at said production side stop position for engaging said lift plate of each of said parts caddies as they are successively positioned at said production side stop position for lifting said lift plate with a stack of items to a predetermined placement position at which a manufacturing robot can grasp an item at the top of a stack of items on said lift plate.

7. The parts supply apparatus of claim 6 wherein an adjustable parts caddy comprises:
   a. a base plate with at least three posts movably mounted at a first end of said posts to a top surface of said base plate;
   b. a lever plate with at least three slot shaped apertures which allow said lever plate to be placed over said movably mounted posts and allow said posts to protrude up through said lever plate which lever plate rests on top of said base plate and wherein when said lever plate is moved with respect to said base plate it changes the position of said movably mounted posts to thereby provide a variable holding space between said posts to hold a stack of items of varying size depending on said space between said posts as determined by movement of said lever plate; and
   c. a lift plate with three slotted apertures through which said three pivotally mounted posts can project, said lift plate being position able over said lever plate and said slots of said lift plate configured to accommodate movement of said posts by said lever plate such that a stack of items can be placed on said lift plate within said space between said posts and wherein said lift plate extends beyond an edge of said base plate and said lever plate to thereby allow an elevating mechanism to lift said lift plate off of said lever plate and thereby lift a stack of items on said lift plate for propositioning items at the top of the stack of items for access by a manufacturing robot.

8. The parts supply apparatus of claim 7 wherein said adjustable parts caddy further comprises:
   a. said at least three movably mounted posts are movably mounted by offset extended base portions from a pivot point such that they are movable in an arch about said pivot point, which pivot points are located on a circumference of a circle about the center of said base plate;
   b. said lever plate is detachably and rotatably attached at said center of said base plate and said slot shaped apertures in said lever plate through which said posts project are formed in the shape of an arch such that when said lever plate is rotated about its center on said base plates said posts move in unison either in towards or out away from said center of said lever plate to thereby describe a variable space that can hold a stack of items of varying size depending the extent said lever plate is rotated; and
   c. a scale positioned at a periphery of said lift plate such that a flange projecting from said lever plate, when said lift plate is positioned on said lever plate aligns with said scale and when calibrated can accurately define the space provided between said posts when said lever plate is moved to adjust a position of said posts.

9. The parts supply apparatus of claim 6 further comprising:
   a. sensor for determining whether or not a parts caddy at said production side stop position has a part positioned by said lift arm for a manufacturing robot operatively coupled to said parts supply apparatus for pick up by said manufacturing robot; and
   b. a computer control system operatively connected to said parts supply apparatus and said manufacturing robot which coordinates operation of said parts supply apparatus and said manufacturing robot to rotate said carrousel with said plurality adjustable parts caddies and position said adjustable caddies at said production side stop after it has been filed and then rotate said plurality of caddies to said operator side stop so the caddie can be refilled with parts for the manufacturing process.

10. The parts supply apparatus of claim 6 wherein the plurality of adjustable parts caddies are positioned around the periphery of said carousel and positioned in a predetermined orientation by a positioning notch of each of said caddies of said plurality of caddies detachably connected to said periphery of said carousel.

11. A method for providing a continuous flow of work pieces for a manufacturing robot during a manufacturing operation comprising the steps of:
    a. providing a carousel rotatable about a center;
    b. providing a plurality of adjustable parts caddies
    c. positioning said plurality of adjustable parts caddies on said carousel, said plurality of parts caddies being adjustable to hold stacks of work pieces of varying size and each caddy having a lift plate to allow the lifting up of a stack of work pieces placed on said plurality of caddies;
    d. providing a power source to rotate said carousel about its center;
    e. rotating in incremental steps said carousel so that each of said plurality of caddies can be successively positioned at a production side stop position where worked pieces positioned in each said caddies can be accessed by a manufacturing robot;
    f. successively positioning each of said caddies after it has been emptied of work pieces at an operations position wherein each of said caddies can be successively filled with a new set of work pieces; and
    g. providing a lift arm at said production side stop position for engaging said lift plate on each of said plurality of parts caddies positioned at said production side stop position for progressively lifting said lift plate with a stack of work pieces to a predetermined placement position at which a manufacturing robot can grasp a work piece at the top of a stack of work pieces on said lift plate.

12. The method of claim 11 wherein the step of providing a plurality of adjustable parts caddies comprises for each caddy the step of:
    a. providing a base plate with at least three posts movably mounted at a first end of said posts to a top surface of said base plate;
    b. providing a lever plate with at least three slot shaped apertures which allow said lever plate to be placed over said movably mounted posts and allow said posts to protrude up through said lever plate which lever plate rests on top of said base plate and wherein when said lever plate is moved with respect to said base plate it changes the position of said movably mounted posts to thereby provide a variable holding space between said posts to hold a stack of items of varying size depending on said space between said posts as determined by movement of said lever plate;
    c. providing a lift plate with three slotted apertures through which said three pivotally mounted posts can project, said lift plate being position able over said lever plate and said slots of said lift plate configured to accommodate movement of said posts by said lever plate such that a stack of items can be placed on said lift plate within said space between said posts and wherein said lift plate extends beyond an edge of said base plate and said lever plate to thereby allow an elevating mechanism to lift said lift plate off of said lever plate and thereby lift a stack of items on said lift plate for prepositioning items at the top of the stack of items for access by a manufacturing robot; and
    d. providing a scale positioned at a periphery of said lift plate such that a flange projecting from said lever plate, when said lift plate is positioned on said lever plate aligns with said scale and when calibrated can accurately define the space provided between said posts when said lever plate is moved to adjust a position of said posts.

\* \* \* \* \*